Patented Nov. 21, 1944

2,363,127

UNITED STATES PATENT OFFICE 2,363,127

REMOVAL OF IRON FROM TIN

Ritson Hastings Graves, Westfield, N. J., assignor to The American Metal Company, Limited, New York, N. Y., a corporation of New York No Drawing. Application May 6, 1943,
Serial No. 485,842

5 Claims. (Cl. 75—85)

This invention relates to a process for purifying tin metal or tin drosses and particularly to the removal of iron therefrom.

In almost all tin smelting operations, iron is present in the ores being treated, and some of it is oxidized and enters the slag while some is reduced and enters the tin metal. Other impurities may also be present, including among others, lead, arsenic, antimony, sulfur, copper and zinc, in varying but usually small amounts. One or more of these impurities may be present as an intermetallic compound with the iron. For instance, a compound like "hard head" containing iron, tin and arsenic may be present or there may be intermetallic compounds of iron and tin, as stated, or iron and arsenic. The presence of iron in metallic tin is objectionable for many purposes and its separation has heretofore been a difficult and expensive matter. Iron is also frequently objectionable in solder and other tin drosses containing it.

Methods have heretofore been employed for separating iron from metallic tin, as follows:

One method is to take the bars of metal as cast from the smelting furnace and pile them in a liquating furnace where a gentle heat is applied sufficient to melt the tin. The low melting tin is removed thereby and most of the iron present is left behind as a residue. In this method of liquation, the dross appears to contain iron-tin ($FeSn_2$) crystals. Thus this dross may consist substantially of a tin and iron compound containing 81% tin and 19% iron, or a ratio of 4.3 tin to 1.0 of iron. In actual practice, if other impurities are present and oxidation of some of the constituents in the liquation operation occurs, this ratio may be somewhat changed, but so far as I am aware, it never approaches the low ratio of tin to iron obtained by me in practising my invention, as described below. The above residue obtained by the prior method employed may be given an oxidizing roast and the iron may thereupon be slagged off in a subsequent smelting operation.

A second method heretofore practised is as follows: The bars of metal may be melted in a kettle at about 650–700° F., whereupon a slushy wet dross is formed containing most of the iron. The amount of dross skimmed in this fashion may be as high as 20 to 50% of the original metal, depending on the iron content thereof. This wet dross may now be placed in a liquation furnace where the low melting tin alloy is melted out at a temperature of about 1200° F., leaving behind an iron residue. The metal thus obtained is then returned to the clean metal in the kettle and the dry dross containing the iron is returned to the smelting furnace. This residue usually has a tin to iron ratio of about 3.5 tin to 1.0 iron.

The methods just mentioned are difficult and expensive to operate. The tin obtained in accordance with the first method contains impurities. The iron remaining as a result of both of the processes has a relatively high tin content. It has been heretofore observed that there is a solubility of iron in tin at elevated temperatures, but as the temperature is decreased, the alloy appears to go through various changes and formations of intermetallic compounds. It appears that crystals of FeSn begin to form in a liquid tin-rich matrix below 800° C. (1472° F.) and this intermetallic compound appears to be transformed into $FeSn_2$ plus tin at lower temperatures, about 925° F. It is apparent that the compound FeSn does not exist in crude tin bars, since it appears to form $FeSn_2$ at temperatures of about 925° F. and below.

I have found in accordance with my invention that by heating metallic tin containing iron and other impurities at temperatures above about 925° F. and stirring, a dross containing crystals which appear to be FeSn is separated out and skimmed from the bath, leaving a correspondingly purified tin. Theoretically, crystals of this formula contain approximately 68% tin and 32% iron, or a ratio of 2.1 tin to 1.0 of iron.

The principal object of the invention accordingly is to provide a simple, efficient process for the removal of impurities, especially iron, from metallic tin.

The invention accordingly consists of a process for purifying metallic tin containing iron and other impurities if present, including heating the impure metallic tin above about 925° F., while stirring, to form a dross containing tin and iron and removing the dross.

I have found by operation in accordance with my invention that iron can readily be removed from tin metal by stirring at moderately high temperatures, about 925° F. to 1472° F. Preferably the temperature is maintained in the range of about 1150–1200° F. In the range just mentioned, 1150–1200° F., a dry dross is formed containing iron and tin and other impurities such as lead, antimony, sulfur, copper and zinc. The tin is correspondingly purified. The dross formed by heating and stirring is removed. It appears that by working at temperatures above about 925° F., compounds of iron and tin, such as FeSn, are crystallized out in a tin-rich liquid and by stirring are separated therefrom. It appears likely that in the presence of arsenic, an intermetallic compound of iron, arsenic and tin is also formed which also separates from the liquid and may be removed therefrom. Also, after and during the formation of this dross, some iron may be oxidized as well as some tin, and other impurities mentioned above, such as lead, antimony, sulfur, copper and zinc, may likewise form compounds with one another or be oxidized to some extent and the combination of these products may exist in the dross.

I have found, furthermore, in practising my method that the tin to iron ratio in the resulting dross is better than that obtained by previous processes. That is, less tin is associated with iron in the drosses made. I have been able, as indicated below, to produce drosses containing only about 40% tin with about 30% iron, this being a ratio of 1.33 tin to 1.0 of iron. This is lower than the theoretical amount corresponding to the intermetallic compound FeSn. This reduction in ratio is probably due to the presence of small amounts of impurities other than iron in the resulting dross. Such a low percentage of tin to iron means that there is only a comparatively small amount of tin to be processed in the by-products. Another advantage of my method is that the time required to make separation of iron from tin is much shorter, thereby reducing the cost. Another advantage is that only a small amount of dry dross is made so that a smaller amount of by-products has to be retreated, with a corresponding decrease in cost of retreatment. Summarizing these advantages, my method permits, among other things, the removal of iron from tin in a shorter time than heretofore with a smaller tin content in the dross, and the separation may be made at a lower cost than in previous methods.

The process may be operated in any standard kettle as used in tin solder or lead operations. A kettle is selected which will withstand temperatures within the range above-mentioned. The usual type of steel kettle and agitator now in common use may be employed at temperatures of 1150-1200° F. The kettle may be heated with coal, oil, gas or other medium which permits an accurate temperature control.

In operating my process, I have found that if the bullion being treated is too high in iron, the dross burden may become too heavy for the impeller or agitator to handle and the efficiency of the process may be reduced. To overcome this difficulty, I have found that a heel of clean metal (that is, tin having a low iron content) should be left in the kettle to dilute the tin bullion high in iron. Instead of leaving this heel of metal in the kettle, I may skim the dross at frequent intervals to eliminate this dross burden. Under ordinary operating conditions, however, the former method, that is, leaving the heel of metal in the kettle, is preferred.

The iron-tin drosses produced by my process may be charged to a reverberatory furnace and smelted with other tin-bearing materials, ores and fluxes, where most of the iron may be slagged off, while the tin enters the bullion.

The following are examples of my invention as I now prefer to practice it. These examples are illustrative and the invention is not to be considered as limited thereto, except as indicated in the appended claims.

*Example 1*

To a 30-ton open kettle containing a small heel of tin, practically free from iron, was added 30,179 lbs. of tin bullion containing 93.82% Sn and 2.80% Fe, the remainder being other impurities, namely, arsenic, sulfur, lead, copper and nickel. The temperature was raised to 1100° F. and the charge stirred in the presence of air at a speed of about 150 R. P. M. for a period of about 1½ hours with an impeller 16" in diameter having a 5" wide blade set at about 45°. At the end of this time a dry dross weighing 3,370 lbs. was removed which assayed 54.5% tin and 25.1% iron, leaving the tin containing a lowered percentage of iron.

Another addition of tin bullion was now made to the metal containing the lowered percentage of iron weighing 31,812 lbs. analyzing 93.65% Sn and 3.82% Fe. After giving the same stirring treatment as outlined above, a dross weighing 4,509 pounds was removed assaying 43.4% Sn and 26.9% Fe. The metal in the kettle now contained only .01% iron and 98.28% tin. 67,738 lbs. of this tin was now cast into anodes for electrolytic refining, while a small heel of metal remained in the kettle.

*Example 2*

21,197 lbs. of tin bullion containing 93.57% Sn and 2.83% Fe, the remainder being other impurities, was added to the heel of Example 1. After stirring as outlined above, 2505 lbs. of dross were skimmed off assaying 57.4% Sn and 24.0% Fe.

The last addition of tin bullion was now made, weighing 29,562 lbs. and containing 94.11% Sn and 4.02% Fe. After stirring in accordance with my invention, a dross was removed weighing 4669 lbs. and assaying 42.7% Sn and 25.4% Fe.

The metal in the kettle now contained only .008% Fe and 98.24% tin. This was all cast out into anodes weighing 66,608 lbs., which were transferred, the same as the previous lot, to the electrolytic refinery for further refining.

What I claim is:

1. A process for purifying metallic tin containing iron as impurity which comprises, heating the impure metallic tin above about 925° F. while stirring to form a tin-iron dross containing substantially all of the iron present as impurity in the form of intermetallic compounds, removing the dross and leaving substantially pure tin.

2. A process for purifying metallic tin containing iron as impurity which comprises, heating the impure metallic tin to about 1100-1200° F. while stirring to form tin-iron dross containing substantially all of the iron present as impurity in the form of intermetallic compounds, removing the dross and leaving substantially pure tin.

3. A process for purifying metallic tin containing iron as impurity which comprises, heating the impure metallic tin to about 1150-1200° F. while stirring with an impeller at sufficient speed to form a dry tin-iron dross containing substantially all of the iron present as impurity in the form of intermetallic compounds, removing the dross and leaving substantially pure tin.

4. A process for purifying metallic tin containing iron as impurity which comprises, combining with a heel of substantially pure tin a quantity of impure iron containing tin and heating the combination above about 925° F. while stirring to form a tin-iron dross containing substantially all of the iron present as impurity in the form of intermetallic compounds, removing the dross and leaving substantially pure tin.

5. A process for purifying tin which comprises heating and stirring metallic tin containing a small proportion of iron, at a temperature of above about 925° F. and producing a tin and iron dross having substantially all of the iron present as impurity in the form of intermetallic compounds.

RITSON HASTINGS GRAVES.